United States Patent
Ikeda et al.

(10) Patent No.: US 11,308,709 B2
(45) Date of Patent: Apr. 19, 2022

(54) DEPOSIT DETECTION DEVICE AND DEPOSIT DETECTION METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 72 days.

(21) Appl. No.: 17/016,876

(22) Filed: Sep. 10, 2020

(65) Prior Publication Data

US 2021/0089802 A1   Mar. 25, 2021

(30) Foreign Application Priority Data

Sep. 20, 2019   (JP) .............................. JP2019-172201

(51) Int. Cl.
*G06V 10/25*   (2022.01)
*G06T 7/73*   (2017.01)

(52) U.S. Cl.
CPC ................ *G06V 10/25* (2022.01); *G06T 7/73* (2017.01)

(58) Field of Classification Search
CPC combination set(s) only.
See application file for complete search history.

(56) References Cited

U.S. PATENT DOCUMENTS

| | | | |
|---|---|---|---|
| 2015/0334385 A1* | 11/2015 | Takemura et al. | ............................ G06K 9/00791 348/175 |
| 2016/0165101 A1* | 6/2016 | Akiyama et al. | ......... G06T 7/42 348/187 |
| 2016/0307054 A1* | 10/2016 | Takemura et al. | ............................ G06K 9/00791 |
| 2018/0315167 A1* | 11/2018 | Akiyama et al. | .. H04N 5/23218 |

FOREIGN PATENT DOCUMENTS

| | | |
|---|---|---|
| JP | 2014-013454 A | 1/2014 |
| JP | 2018-191087 A | 11/2018 |
| JP | 2019-128797 A | 8/2019 |

* cited by examiner

*Primary Examiner* — Andrew W Johns
(74) *Attorney, Agent, or Firm* — Oliff PLC

(57) ABSTRACT

A deposit detection device according to an embodiment includes a detection module and a determination module. The detection module detects a deposit region including a deposit adhering to a lens of an imaging device from a captured image captured by the imaging device. The determination module performs maintenance determination as to whether to maintain a detection history of detection by the detection module, based on brightness information of the captured image.

6 Claims, 8 Drawing Sheets

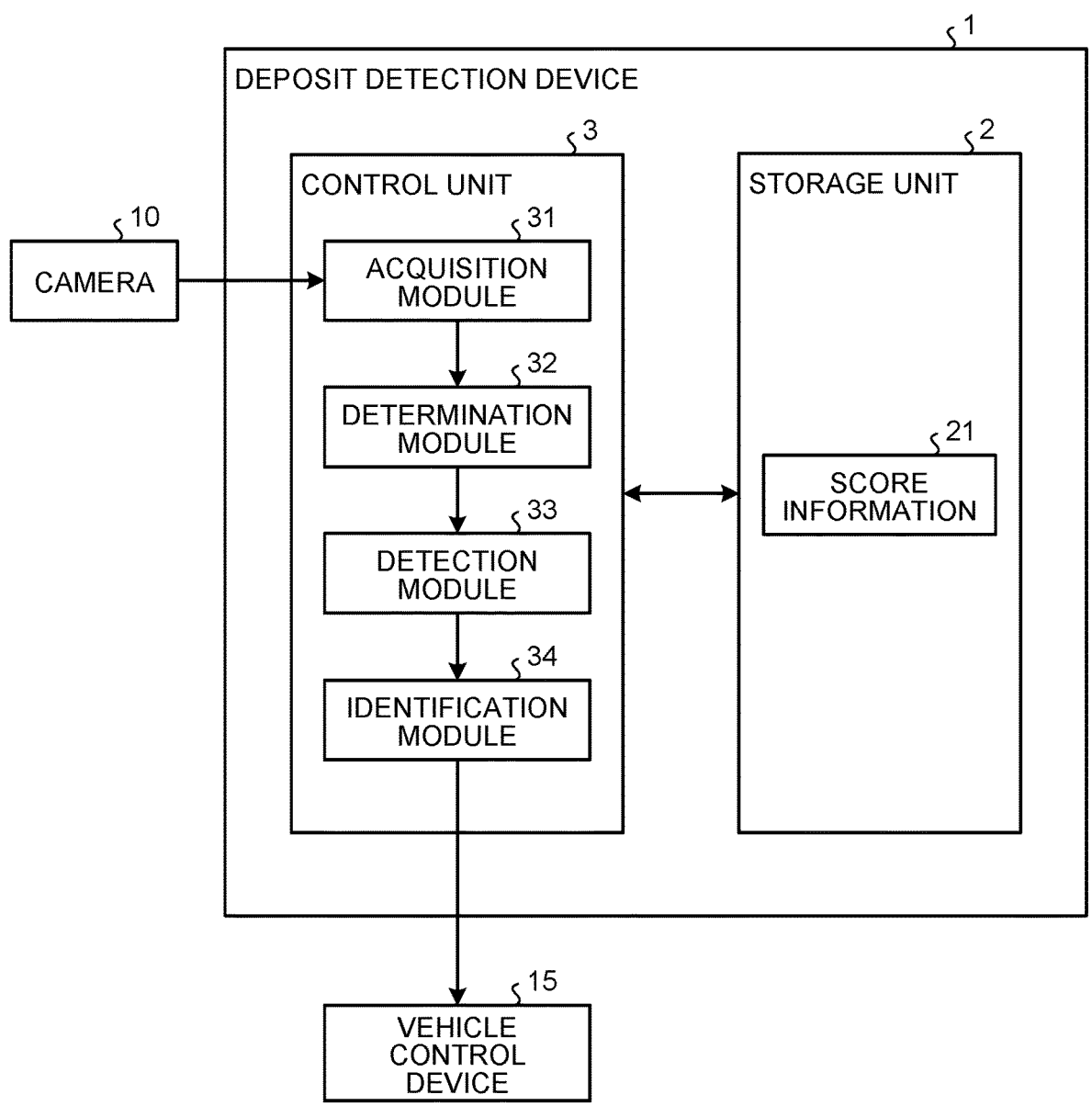

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172201, filed on Sep. 20, 2019, the entire contents of which are incorporated herein by reference.

FIELD

The embodiment discussed herein is directed to a deposit detection device and a deposit detection method.

BACKGROUND

Conventionally, there is a deposit detection device that detects a deposit region exhibiting a deposit adhering to a camera lens, based on a captured image captured by a camera mounted on a vehicle, for example. Such a deposit detection device identifies a deposit region, based on the continuity in the detected deposit region (for example, refer to Japanese Laid-open Patent Publication No. 2019-128797).

Unfortunately, the conventional technique has room for improvement in identifying the detected deposit region early. Specifically, if the camera moves to an environment that reduces the accuracy in detecting a deposit region in a state in which a deposit has been detected, the deposit fails to be detected and the continuity fails to be determined.

SUMMARY

A deposit detection device according to an embodiment includes a detection module and a determination module. The detection module detects a deposit region including a deposit adhering to a lens of an imaging device from a captured image captured by the imaging device. The determination module performs maintenance determination as to whether to maintain a detection history of detection by the detection module, based on brightness information of the captured image.

BRIEF DESCRIPTION OF DRAWINGS

FIG. 2 is a block diagram of the deposit detection device;

DESCRIPTION OF EMBODIMENTS

A deposit detection device and a deposit detection method according to an embodiment will be described below with reference to the accompanying drawings. It should be noted that the present invention is not limited by the embodiment described below.

Figure 1A:
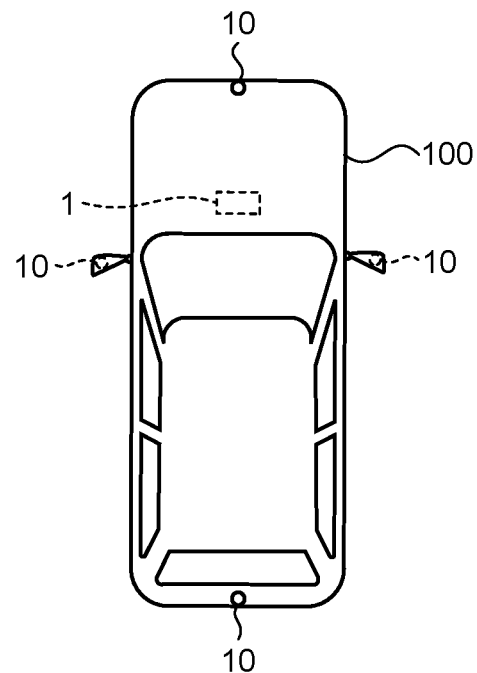
FIG. 1A is a diagram illustrating an installation example of a deposit detection device.
Figure 1B:
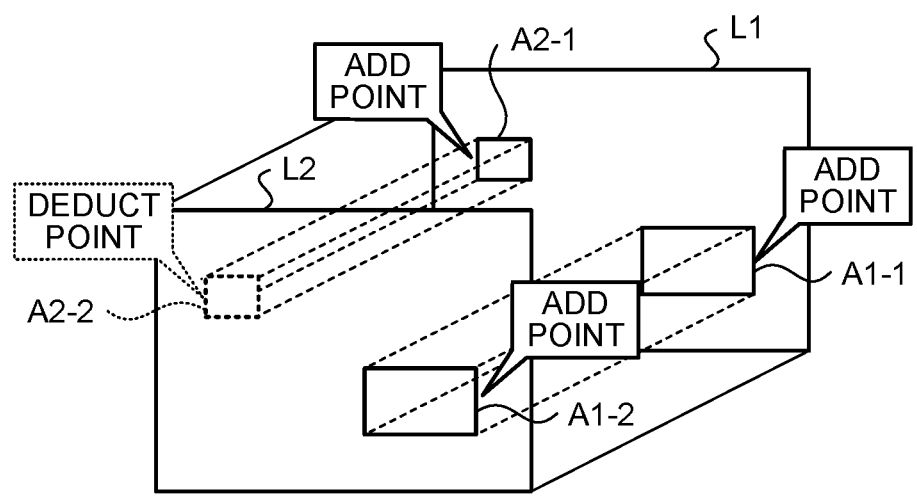
FIG. 1B is a diagram (1) illustrating an overview of a deposit detection method.
Figure 1C:
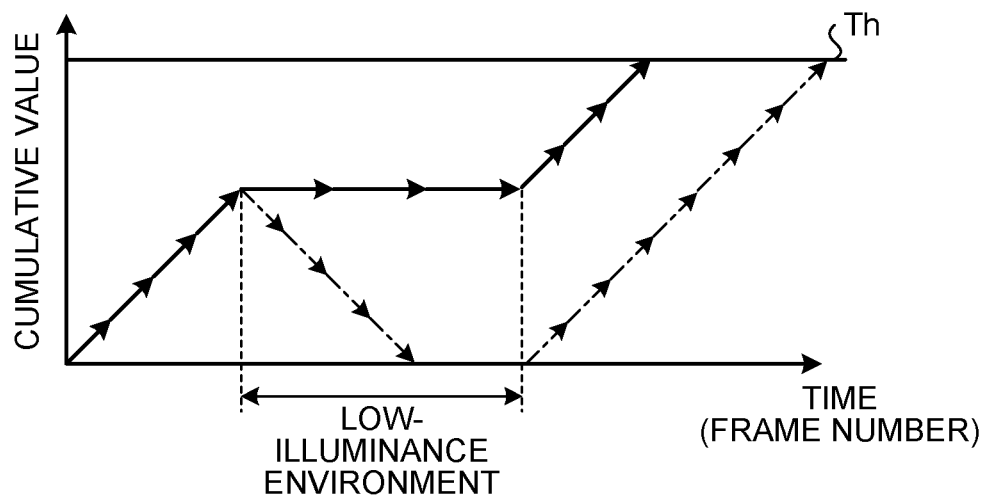
FIG. 1C is a diagram (2) illustrating an overview of the deposit detection method.

Referring first to FIG. 1A to FIG. 1C, an overview of the deposit detection device and the deposit detection method according to the embodiment will be described. FIG. 1A is a diagram illustrating an installation example of the deposit detection device. FIG. 1B and FIG. 1C are diagrams illustrating an overview of the deposit detection method.

As illustrated in FIG. 1A, a deposit detection device 1 is installed on a vehicle 100. The vehicle 100 has, for example, four cameras 10 capturing images in different directions. Images L captured by the cameras 10 are used, for example, for white line detection and a variety of sensing for autonomous driving of the vehicle 100.

Since the camera 10 is disposed on the outside of the vehicle 100, deposits such as water droplets and dust may adhere to the lens (not illustrated) of the camera 10. The deposit detection device 1 acquires the image L captured by the camera 10 that is an imaging device installed on the vehicle 100 and detects from the captured image L a deposit region in which a deposit adheres to the lens.

The deposit detection device 1 detects a deposit region, for example, by extracting a brightness pattern indicating the feature of a deposit from the captured image L. In addition, the deposit detection device 1 can suppress an erroneous detection of a deposit region by determining the continuity in the deposit region based on a detection history of the deposit region and identifying the deposit region.

For example, as illustrated in FIG. 1B, the deposit detection device 1 detects a deposit region from each of time-series captured images L and adds a point to the region detected as a deposit region. When the cumulative value of points exceeds a threshold value, the deposit detection device 1 identifies the region as a deposit region.

In the example illustrated in FIG. 1B, deposit regions A1-1 and A2-1 are detected in an image L1 that was last captured, and in a present captured image L2, a deposit region A1-2 corresponding to the deposit region A1-1 is detected and a deposit region A2-2 corresponding to the deposit region A2-1 is not detected.

In this case, a deposit region A1 is detected in both of the captured image L1 and the captured image L2, and a point is added twice. A deposit region A2 is detected in the captured image L1 but not detected in the captured image L2, and therefore, a point is added in the last captured image L1 and then deducted in the present captured image L2.

As described above, the deposit detection device 1 detects a deposit region A by extracting a brightness pattern indicating the feature of a deposit from the captured image L. For example, when the vehicle 100 moves from a bright place to a dark place (hereinafter referred to as a low-illuminance environment), the brightness of the captured image L is reduced as a whole, making it difficult to detect a deposit region in some cases.

Thus, the deposit detection device 1 according to the embodiment maintains a detection history of a deposit region, based on the brightness information of the captured image L. Specifically, as illustrated in FIG. 1C, the deposit detection device 1 maintains the cumulative value of points of a deposit region, for example, in a low-illuminance environment.

When the vehicle moves from the low-illuminance environment to the outside of the low-illuminance environment, the deposit detection device 1 takes over the cumulative value before the vehicle moves to the low-illuminance environment. The deposit detection device 1 then identifies the deposit region, for example, at the point of time when the cumulative value reaches a threshold value Th. As will be described later, the deposit detection device 1 can determine whether the vehicle is in a low-illuminance environment, based on the brightness information of the captured image L.

By contrast, as indicated by a dashed-dotted line in FIG. 1C, when a similar process to that in the outside of a low-illuminance environment is performed in the low-illuminance environment, a deposit region is not detected in the low-illuminance environment and a point may be deducted from the cumulative value.

In this case, when the vehicle moves from the low-illuminance environment to the outside of the low-illuminance environment, a point is added from a cumulative value of zero (a state in which the detection history is reset) for the detected deposit region. Consequently, it takes time for the sum of the cumulative value to reach the threshold value Th and it takes time until the deposit region is identified.

In this way, the deposit detection device 1 according to the embodiment maintains the detection history of a deposit region in accordance with the brightness information of the captured image L. With this configuration, the deposit detection device 1 can identify the detected deposit region early because no point is deducted from the cumulative value of the deposit region in a low-illuminance environment in which detection of a deposit region is unstable.

In the example above, maintenance determination is performed based on the brightness information of the present captured image. Alternatively, the present maintenance determination may be performed based on the brightness information of a frame in the past (for example, previous frame), or the present maintenance determination may be performed based on the brightness information of a plurality of frames.

Referring now to FIG. 2, a configuration example of the deposit detection device 1 according to the embodiment will be described. FIG. 2 is a block diagram illustrating a specific example of the deposit detection device 1. FIG. 2 also illustrates the camera 10 and a vehicle control device 15.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, and sides of the vehicle 100 can be captured, and output the captured images L to the deposit detection device 1.

The vehicle control device 15 is a control device that controls autonomous driving of the vehicle 100. This control device performs vehicle control such as autonomous driving, autonomous parking control, and driving assistance (for example, pre-crash safety system (PCS) and advanced emergency braking system (AEB)) of the vehicle 100. The vehicle control device 15 may be a separate unit from an autonomous parking control unit that performs autonomous parking control.

The vehicle control device 15 can detect an obstacle or a white line from the captured image L input through the deposit detection device 1 and perform the above-noted vehicle control based on the detection result.

The deposit detection device 1 includes a storage unit 2 and a control unit 3. For example, the storage unit 2 is implemented by a semiconductor memory device such as a RAM and a flash memory, or a storage device such as a hard disk and an optical disc and stores therein score information 21 in the example in FIG. 2.

Figure 3:
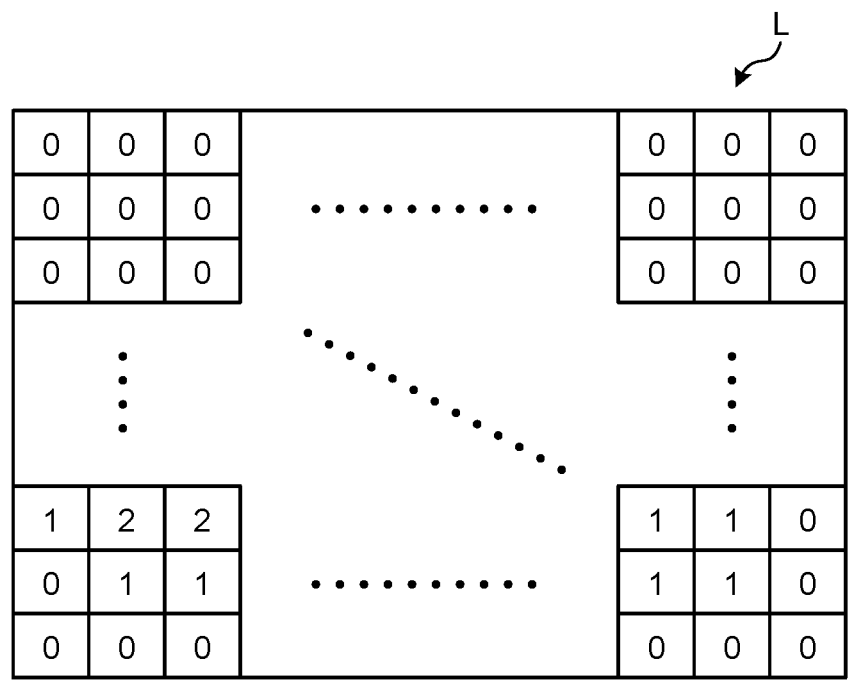
FIG. 3 is a schematic diagram of score information.

The score information 21 corresponds to the detection history of a deposit region. FIG. 3 is a schematic diagram of the score information 21. As illustrated in FIG. 3, the score information 21 is information on a cumulative value for each of divided regions Da obtained by dividing the captured image L into multiple parts.

In the example illustrated in FIG. 3, a larger cumulative value indicates a higher possibility of being a deposit region A. The lower limit of the cumulative value is "0", indicating that the detection history for the deposit region in a divided region Da is reset at the point of time when the cumulative value of the divided region is "0".

When a detection module 33 described later detects a deposit region A, a point is added to the score for the corresponding divided region Da, and a point is deducted from the score for a divided region Da that is not detected as a deposit region A. These cumulative values are stored as the score information 21 in the storage unit 2.

The divided region Da may be, for example, a unit of one pixel or may be a unit of predetermined pixels larger than one pixel. As will be described later, the detection module 33 may detect a light-transmitting deposit such as water droplet or a light-blocking deposit such as dirt as a deposit. The score information 21 may be stored in the storage unit 2 according to the kinds of deposits.

Returning now to FIG. 2, the control unit 3 will be described. The control unit 3 is a controller and implemented by, for example, a CPU or an MPU executing a variety of computer programs stored in the storage unit 2 using a RAM as a working area. The control unit 3 may be implemented by an integrated circuit such as an ASIC and an FPGA.

As illustrated in FIG. 2, the control unit 3 includes an acquisition module 31, a determination module 32, the detection module 33, and an identification module 34. The acquisition module 31 acquires an image input from the camera 10. The acquisition module 31 generates a current frame based on the acquired image. Specifically, the acquisition module 31 performs a gray-scale process of converting each pixel in the acquired image into grayscale gradation ranging from white to black according to its brightness.

The acquisition module 31 also performs a pixel thinning process on the acquired image and generates an image having a size smaller than the acquired image. The acquisition module 31 generates a current frame that is an integrated image of the sums and the sums of squares of pixel values in the pixels, based on the image subjected to the thinning process. As used herein, a pixel value is information corresponding to brightness or an edge of a pixel.

In this way, the deposit detection device 1 can accelerate calculation in the processes in the subsequent stages by performing the thinning process on the acquired image and generating the integrated image. This processing can reduce the process time taken for detecting a deposit.

The acquisition module 31 may perform a smoothing process for the pixels, using a smoothing filter such as an averaging filter. The acquisition module 31 does not necessarily perform the thinning process and may generate a current frame having the same size as that of the acquired image. Hereinafter the current frame may be referred to as a captured image L.

The determination module 32 performs maintenance determination as to whether to maintain the previous detection history of detection by the detection module 33, based on the brightness information of the captured image L. Here, as described above, the accuracy in detecting a deposit region A by the detection module 33 is reduced when the illuminance of the region imaged by the camera 10 is low, that is, when the brightness of the captured image L is low.

The determination module 32 therefore calculates the brightness average in a predetermined target region in the captured image L and, when the calculated brightness average is equal to or smaller than a threshold value, determines that the vehicle is in a low-illuminance environment, and determines to maintain the detection history of detection by the detection module 33.

Figure 4A:
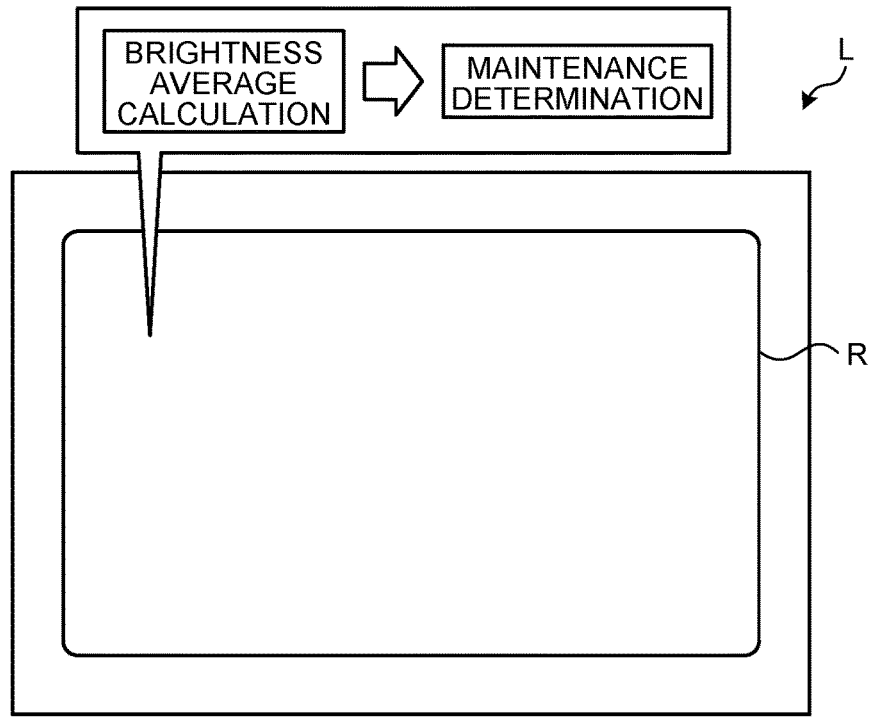
FIG. 4A is a diagram (1) illustrating an example of a target region of maintenance determination.
Figure 4B:
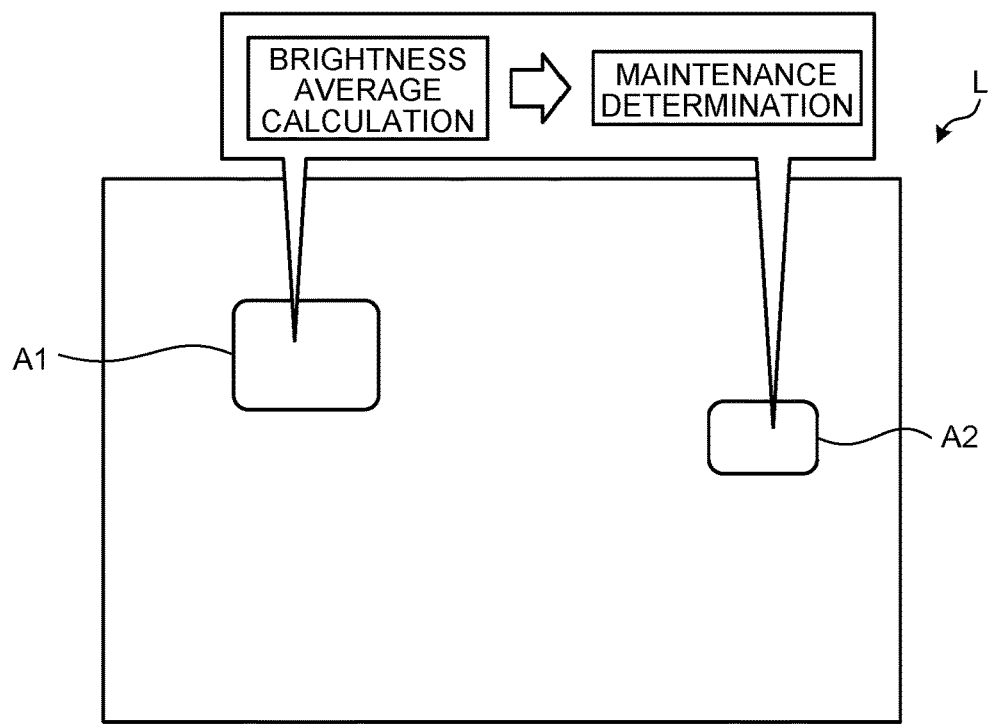
FIG. 4B is a diagram (2) illustrating an example of a target region of the maintenance determination.

FIG. 4A and FIG. 4B are diagrams each illustrating an example of a target region for the maintenance determination. In the example illustrated in FIG. 4A, a target region for the maintenance determination is a region of interest R, and the region of interest R is a region other than end portions substantially along the outer periphery of the captured image L.

The region of interest R is a region particularly necessary in control of the vehicle 100. By contrast, a region other than the region of interest R is a region where, for example, a road surface relatively far from the vehicle 100 appears, and therefore can be a region of less importance compared with the region of interest R.

That is, the determination module 32 sets only a region directly related to control of the vehicle 100 as a target for the maintenance determination. With this configuration, compared with when the maintenance determination is performed based on the brightness average of all the regions in the captured image L, the brightness value in the region of interest R is reflected more in the maintenance determination.

In doing so, it is preferable that the determination module 32 calculate the average brightness excluding the brightness of a region in which the body of the vehicle 100 appears in the region of interest R. The region in which the body appears may be set by a dealer at the time of initial setting or may be detected by the deposit detection device 1 through image processing on the captured image L. The region of interest R in FIG. 4A is illustrated by way of example and can be set as desired.

As will be described later, the detection module 33 can also detect a region in which a light-blocking deposit adheres (hereinafter referred to as a light-blocking region). In this case, the determination module 32 may calculate the brightness average, excluding the brightness of the light-blocking region from the region of interest R. This is because the light-blocking region has a low brightness value and inclusion of the light-blocking region in calculation of the brightness average yields a low brightness average and may lead to reduction in accuracy of the maintenance determination.

As illustrated in FIG. 4B, the determination module 32 may perform maintenance determination for each deposit region A as a target region, instead of the region of interest R. Specifically, first of all, the determination module 32 refers to the score information 21 and extracts a deposit region A. For example, the determination module 32 extracts, as one deposit region A, successive divided regions Da in which the cumulative values of points are other than "0". In the example illustrated in FIG. 4B, a deposit region A1 and a deposit region A2 are extracted.

The determination module 32 then calculates the brightness average for each of the extracted deposit regions A and performs the maintenance determination for each deposit region A. In this way, the determination module 32 performs the maintenance determination individually for the deposit regions A, thereby improving the accuracy in the maintenance determination for the deposit regions A.

The determination module 32 may perform the maintenance determination for the identified deposit region A as a target region. The determination module 32 may set both of the region of interest R and the deposit region A as the target regions for the maintenance determination. In this case, the determination module 32 may perform the maintenance determination for the region of interest R and each deposit region A and perform final maintenance determination based on the respective results of the maintenance determination.

Figure 5:
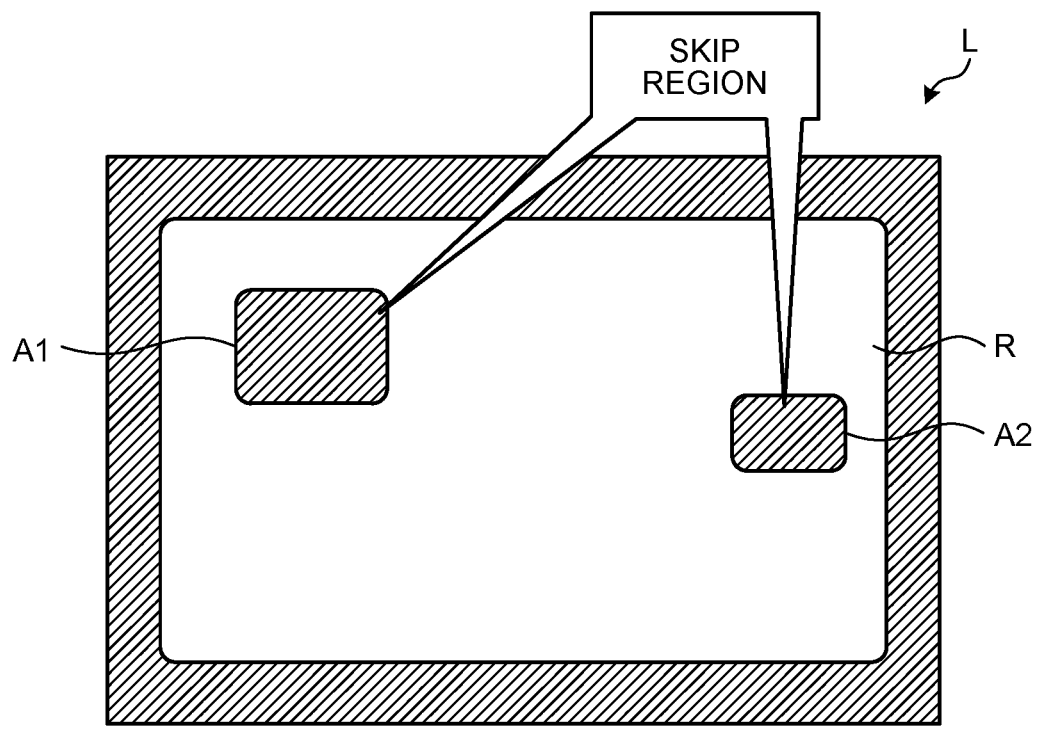
FIG. 5 is a diagram illustrating an example of a skip region.

Subsequently, if the result of the maintenance determination is to maintain the detection history, the determination module 32 sets a skip region. As used herein, the skip region is a region in which the process of detecting a deposit region A is skipped by the detection module 33 described later. FIG. 5 is a diagram illustrating an example of the skip region.

In the example illustrated in FIG. 5, the skip region is hatched, and the deposit regions A1 and A2 are set as skip regions. That is, when the brightness average of the region of interest R is equal to or smaller than a threshold value, the determination module 32 sets the deposit region A included in the region of interest R as a skip region.

A region substantially along the outer periphery of the captured image L (a region other than the region of interest R) is a region unnecessary in control of the vehicle 100 in particular and is set as a skip region by default.

In this way, the determination module 32 sets the deposit regions A1 and A2 as skip regions and does not set the region of interest R other than the deposit regions A1 and A2 as a skip region. Thus, while the deposit region detecting process is skipped for the deposit regions A1 and A2, the region of interest R other than the deposit regions A1 and A2 is continuously subjected to detection of a deposit region A by the detection module 33.

This is because the score is already "0" in the region of interest R other than the deposit regions A1 and A2 and no point is deducted. If a deposit actually adheres and a region of the deposit can be detected as a deposit region A, a new point is added for the deposit region A, so that the deposit region A can be identified early.

That is, the deposit detection device 1 can maintain the cumulative value of the points in the deposit region A by setting the deposit region A as a skip region, while continuously detecting a new deposit region A for the region other than the skip region.

Thus, a deposit region A can be identified early in the entire captured image L (the skip region and the region other than the skip region).

Returning back to the description of FIG. 2, the detection module 33 will be described. The detection module 33 detects a deposit region A in which a deposit adheres to the lens from the image L captured by the imaging device (camera 10).

In the present embodiment, the detection module 33 performs the process of detecting a deposit region A, excluding the skip region set by the determination module 32. This configuration can reduce the process load, compared with when a deposit region A is detected from the entire captured image L. The detection module 33 may detect a deposit region A even for the skip region. In this case, the identification module 34 may not incorporate the detection result of the skip region into the score information 21.

The detection module 33 detects, as a deposit, a light-transmitting deposit such as water droplets and a light-blocking deposit such as dirt, based on the pixel values, using different algorithms.

First, an example of the detection algorithm for water droplets is described. A water droplet has a round shape and a characteristic that the edge intensity of a boundary between the water droplet and the other region is high. The edge intensity herein indicates the intensity of edge gradient in the captured image L.

The detection module 33 detects a water droplet, for example, by template matching using a strip-like template corresponding to the edge of a water droplet. For example, the detection module 33 extracts divided regions Da each having the edge intensity exceeding a predetermined threshold value. Subsequently, when the shape obtained by connecting continuous divided regions Da in the extracted divided regions Da is similar to the template, the detection module 33 detects the continuous divided regions Da as the edge of a water droplet.

Upon detecting the edge of a water droplet, the detection module 33 detects the divided regions Da surrounded by the edge as a deposit region A. Since water droplets may have various shapes and sizes, it is preferable to prepare a plurality of templates.

An example of the detection algorithm for a light-blocking deposit is described. For example, the detection module 33 calculates the proportion of pixels having a brightness value equal to or smaller than a predetermined value, for each divided region Da. The detection module 33 detects a divided region Da having a proportion exceeding a predetermined threshold value, as a light-blocking region in which a light-blocking deposit adheres.

The identification module 34 identifies a deposit region A, based on the detection history of the deposit region A. In other words, the identification module 34 identifies the deposit region A by grasping the continuity of each deposit region A.

Specifically, the identification module 34 updates the score information 21 based on the result of detection by the detection module 33 and identifies a divided region Da having the cumulative value of points exceeding the threshold value Th, as a deposit region A.

The identification module 34 deducts a point for the divided region Da identified as a deposit region A if it is not detected as a deposit region A in the next and subsequent times. With this configuration, when a deposit adhering to the lens drops off from the lens, the identification module 34 cancels the identified deposit region A.

In the present embodiment, when a divided region Da previously detected as a deposit region A (a region with a cumulative value other than "0") is set as a skip region this time, the identification module 34 does not update the score information 21 of such a divided region Da and maintains the previous cumulative value.

When the same divided region Da is successively set as a skip region, the identification module 34 repeatedly performs the process for a skip region for such a divided region Da and thereby maintains the cumulative value before the divided region is set as a skip region.

Figure 6:
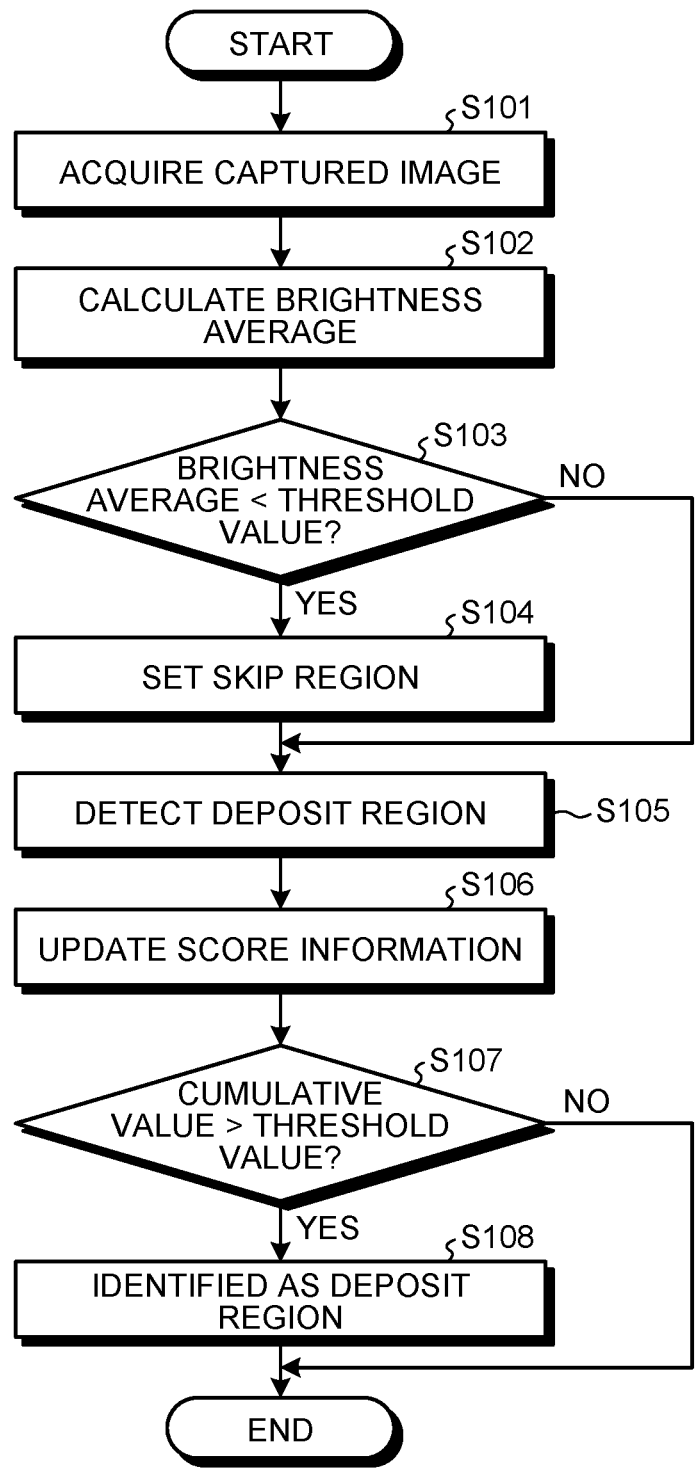
FIG. 6 is a flowchart (1) illustrating a process procedure performed by the deposit detection device.

Referring to FIG. 6, a process procedure performed by the deposit detection device 1 according to the embodiment will now be described. FIG. 6 is a flowchart illustrating a process procedure performed by the deposit detection device 1. The process procedure described below is repeatedly performed by the control unit 3 every time the captured image L is acquired.

As illustrated in FIG. 6, first of all, the deposit detection device 1 acquires the captured image L (step S101) and then calculates the brightness average of the region of interest R (step S102). Subsequently, the deposit detection device 1 determines whether the calculated brightness average is smaller than a threshold value (step S103).

If the brightness average is smaller than a threshold value in the determination process at step S103 (Yes at step S103), the deposit detection device 1 determines that the vehicle is in a low-illuminance environment and sets a skip region (step S104), and detects a deposit region A (step S105).

Subsequently, the deposit detection device 1 updates the score information 21 in accordance with the determination result at step S105 (step S106) and determines whether the cumulative value of points is greater than a threshold value for each divided region Da (step S107).

If the cumulative value is greater than a threshold value (Yes at step S107), the deposit detection device 1 identifies such a divided region Da as a deposit region A (step S108) and terminates the process. For a divided region Da having a cumulative value equal to or smaller than a threshold value in the determination process at step S107 (No at step S107), the deposit detection device 1 terminates the process.

If the brightness average is equal to or greater than a threshold value in the determination at step S103 (No at step S103), the deposit detection device 1 proceeds to the process at step S105.

As described above, the deposit detection device 1 according to the embodiment includes the detection module 33 and the determination module 32. The detection module 33 detects a deposit region A including a deposit adhering to the lens of the camera 10, from the image L captured by the camera 10 (imaging device). The determination module 32 performs the maintenance determination as to whether to maintain the detection history of detection by the detection module 33, based on the brightness information of the captured image L. The deposit detection device 1 according to the embodiment therefore can identifies the detected deposit early.

In the foregoing embodiment, when it is determined that the vehicle is in a low-illuminance environment, a skip region is set and the score information is updated for a region other than the skip region. In a modification, when it is determined that the vehicle is in a low-illuminance environment after the deposit region is identified, the deposit detection process may be prohibited from being performed for the entire captured image L. In other words, when it is determined that the vehicle is in a low-illuminance environment after the deposit region A is identified, the previous cumulative value may be maintained without updating the score information of all the divided regions Da.

Figure 7:
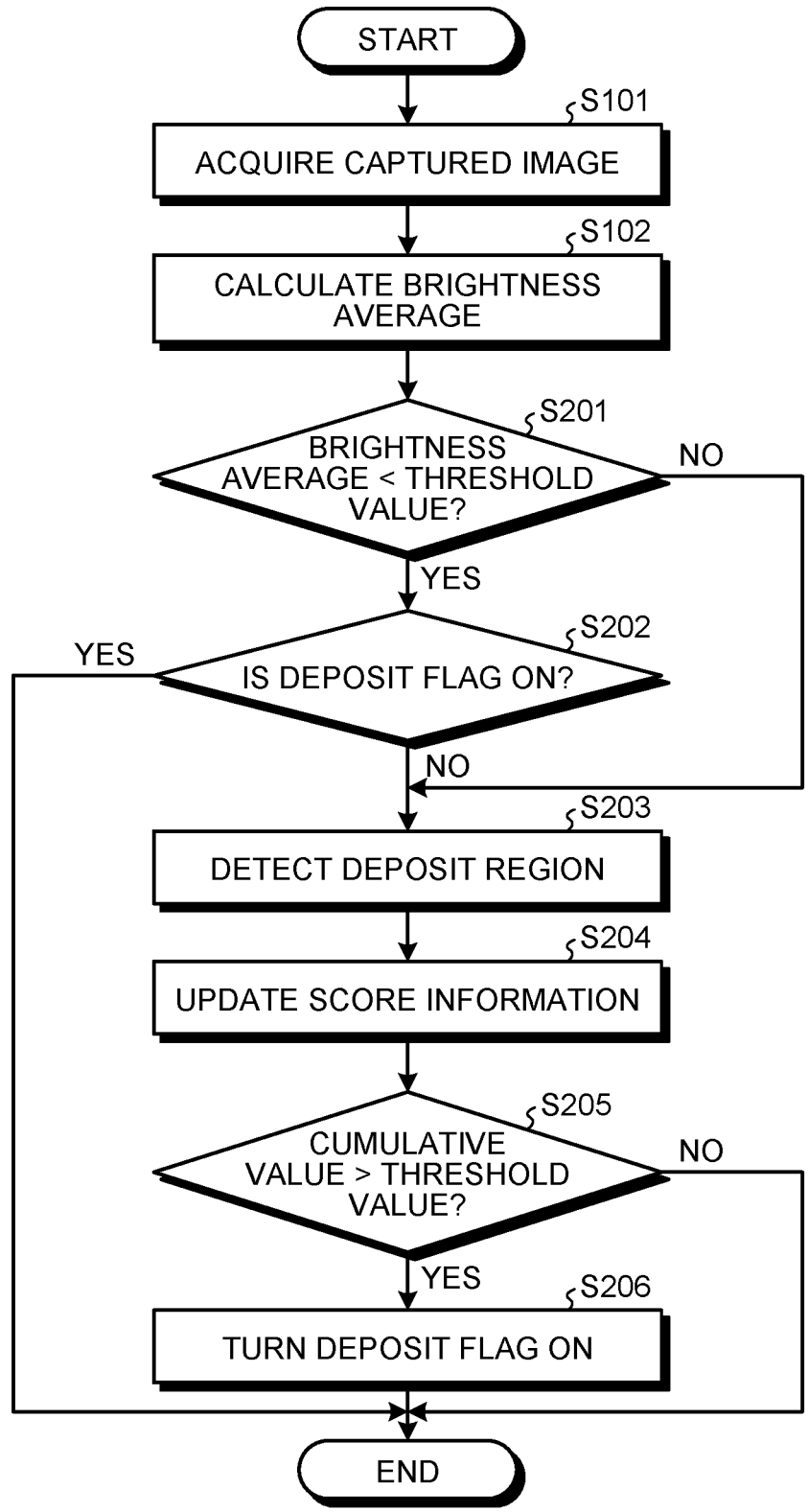
FIG. 7 is a flowchart (2) illustrating a process procedure performed by the deposit detection device.

FIG. 7 is a flowchart illustrating a process procedure performed by the deposit detection device 1. The processing at step S101 and step S102 illustrated in FIG. 7 is the same as step S101 and step S102 illustrated in FIG. 6, and the description here starts from step S201.

As illustrated in FIG. 7, the deposit detection device 1 determines whether the brightness average is smaller than a threshold value (step S201), and if the brightness average is smaller than a threshold value (Yes at step S201), that is, if it is determined that the vehicle is in a low-illuminance environment, it is determined whether a deposit flag, which is turned on when a deposit region A is identified in any divided region Da, is on (step S202).

If the deposit flag is off in all the divided regions Da (No at step S202), the deposit detection device 1 detects a deposit region (step S203) and updates score information (step S204). The deposit detection device 1 then determines whether the cumulative value of any divided region Da is greater than a threshold value (step S205), and if the cumulative value is greater than a threshold value (Yes at step S205), identifies the deposit region A and turns on the deposit flag (step S206), and terminates the process.

On the other hand, if the deposit flag is on in the determination at step S202 (Yes at step S202), the deposit detection device 1 skips the processes subsequent to step S203 and terminates the process.

If the brightness average is greater than a threshold value in the determination at step S201 (No at step S201), that is, if it is determined that the vehicle is not in a low-illuminance environment, the deposit detection device 1 proceeds to the process at step S203.

This configuration can prevent a situation such as cancelling of the identified deposit region due to a low-illuminance environment after the deposit region is identified and can simplify the process performed in a low-illuminance environment.

In the foregoing embodiment, the maintenance determination is performed based on the brightness information of the captured image L. However, the present invention is not limited to such an embodiment. More specifically, the maintenance determination may be performed, for example, based on the detection result of an illuminance sensor that measures the illuminance of a region imaged by the camera 10.

In the foregoing embodiment, the deposit detection device 1 is applied to the on-vehicle camera 10. However, the deposit detection device 1 may be applied to other kinds of cameras such as monitoring/security cameras set inside or outside buildings or on roads, for example.

According to the present invention, the detected deposit can be identified early.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device comprising:
   a detection module configured to detect a deposit region from a captured image captured by an imaging device, the deposit region including a deposit adhering to a lens of the imaging device; and
   a determination module configured to perform maintenance determination as to whether to maintain a detection history of detection by the detection module, based on brightness information of the captured image.

2. The deposit detection device according to claim 1, wherein the determination module performs the maintenance determination, based on the brightness information of a region of interest set in the captured image.

3. The deposit detection device according to claim 1, wherein the determination module performs the maintenance determination for each deposit region, based on the brightness information for the corresponding deposit region.

4. The deposit detection device according to claim 1, wherein when the determination module determines to maintain the detection history, the detection module skips a detection process for the deposit region previously detected.

5. The deposit detection device according to claim 4, wherein when the determination module determines to maintain the detection history, the detection module continues a detection process for a new deposit region.

6. A deposit detection method comprising:
   detecting a deposit region from a captured image captured by an imaging device, the deposit region including a deposit adhering to a lens of the imaging device; and
   determining whether to maintain a detection history of detection at the detecting, based on brightness information of the captured image.

* * * * *